United States Patent
Zeiber

(10) Patent No.: US 10,975,994 B2
(45) Date of Patent: Apr. 13, 2021

(54) QUICK-COUPLING WITH INTERNAL SLIDE LOCKING MECHANISM

(71) Applicant: Parker-Hannifin Corporation, Cleveland, OH (US)

(72) Inventor: Dennis C. Zeiber, Erie, PA (US)

(73) Assignee: Parker-Hannifin Corporation, Cleveland, OH (US)

( * ) Notice: Subject to any disclaimer, the term of this patent is extended or adjusted under 35 U.S.C. 154(b) by 84 days.

(21) Appl. No.: 16/233,446

(22) Filed: Dec. 27, 2018

(65) Prior Publication Data

US 2019/0219209 A1    Jul. 18, 2019

Related U.S. Application Data

(60) Provisional application No. 62/617,676, filed on Jan. 16, 2018.

(51) Int. Cl.
*F16L 37/23* (2006.01)
*F16L 37/40* (2006.01)
*F16L 37/34* (2006.01)

(52) U.S. Cl.
CPC ............... *F16L 37/23* (2013.01); *F16L 37/34* (2013.01); *F16L 37/40* (2013.01)

(58) Field of Classification Search
CPC . F16L 37/23; F16L 37/38; F16L 37/40; F16L 37/413; F16L 37/42; F16L 37/30; F16L 37/32; F16L 37/34; F16L 37/35
See application file for complete search history.

(56) References Cited

U.S. PATENT DOCUMENTS

| | | | | |
|---|---|---|---|---|
| 2,744,770 A * | 5/1956 | Davidson | ............... | F16L 37/40 285/316 |
| 5,092,364 A * | 3/1992 | Mullins | .................... | F16L 37/23 137/614.05 |
| 5,290,009 A | 3/1994 | Heilmann | | |
| 5,323,812 A * | 6/1994 | Wayne | ..................... | F16L 37/23 137/614.03 |
| 5,445,358 A * | 8/1995 | Anderson | ............... | F16L 37/23 251/149.6 |
| 6,279,874 B1 * | 8/2001 | Nyberg | ................. | F16L 37/121 137/614.03 |
| 6,511,100 B1 | 1/2003 | Le Clinche | | |
| 6,779,778 B2 * | 8/2004 | Kuwahara | ............... | F16L 37/23 251/149.9 |

(Continued)

*Primary Examiner* — David Colon-Morales
(74) *Attorney, Agent, or Firm* — Renner, Otto, Boisselle & Sklar, LLP

(57) ABSTRACT

A coupler assembly includes a valve with a locking ball locking mechanism and a locking sleeve interacting with the locking balls to lock the valve in the connected position. A slider is positioned radially between the ball body and the locking sleeve, and longitudinally inward relative to the locking balls. During a connection operation to a nipple, the slider is moveable along the ball body to permit movement of the locking balls into an inner recess defined by the locking sleeve as the valve moves toward the connected position. The slider is biased to return to the first slider position. During a disconnection operation, the locking sleeve is moved to a second sleeve position. As the nipple moves longitudinally outward, a surface of a locking shoulder of the nipple moves the locking balls into an outer recess of the locking sleeve to permit removal of the nipple.

13 Claims, 5 Drawing Sheets

(56) References Cited

U.S. PATENT DOCUMENTS

| | | | |
|---|---|---|---|
| 6,908,118 B2 * | 6/2005 | Fumioka | A61M 39/1011 |
| | | | 285/277 |
| 7,828,266 B2 * | 11/2010 | Asai | F16L 37/23 |
| | | | 251/149.6 |
| 7,926,783 B1 * | 4/2011 | Liu | F16L 37/44 |
| | | | 251/149.6 |
| 8,191,932 B2 * | 6/2012 | Davis | F16L 37/23 |
| | | | 137/614.05 |
| 8,205,914 B2 | 6/2012 | Chappaz et al. | |
| 8,356,794 B1 * | 1/2013 | Liu | F16L 37/42 |
| | | | 251/149.6 |
| 9,752,713 B2 * | 9/2017 | Tiberghien | F16L 37/42 |
| 10,514,121 B2 * | 12/2019 | Wada | F16L 37/32 |
| 2014/0116533 A1 * | 5/2014 | Edler | F16L 37/42 |
| | | | 137/315.01 |

* cited by examiner

QUICK-COUPLING WITH INTERNAL SLIDE LOCKING MECHANISM

RELATED APPLICATIONS

This application claims the benefit of U.S. Provisional Application No. 62/617,676 filed Jan. 16, 2018, which is incorporated herein by reference.

FIELD OF INVENTION

The present invention relates generally to quick couplings that provide a push-to-connect locking mechanism in a fluid system, such as for example as used in a breathing apparatus.

BACKGROUND OF THE INVENTION

Quick couplings that provide a push-to-connect locking mechanism have a variety of applications. One example is a breathing apparatus, such as may be used by firefighters, in which a breathing mask is connected via tubing to an air supply. An end of the tubing has a nipple that is inserted into a connector on the breathing apparatus component that includes the air supply. Insertion of the nipple operates to open a valve to permit the flow of air. Such systems may enable a "buddy breather" configuration, by which a second person connects a second breathing mask to access the air supply of a first person who is breathing via a first breathing mask. Such a system may be used, for example, by firefighters who share air when the air supply of one firefighter becomes low, or a firefighter may provide air to a victim in tandem with the firefighter.

Because buddy breather systems are employed under dangerous circumstances, a quick and reliable connection is required. Accordingly, quick couplings having a push-to-connect locking mechanism are employed for ease of use. In a typical configuration, insertion of the nipple operates to push on a spring loaded valve to open the valve to permit the flow of air. An outer ring-shaped or annular locking sleeve is spring loaded and pushed back permitting a plurality of locking balls to fall into a locking groove on the nipple to hold the connection. Such couplings further may employ a cocking ring, which constitutes an inner ring relative to the locking sleeve that aids in holding the locking balls against the spring loaded locking sleeve.

This conventional configuration, however, may experience a "mis-latch" during a failed angular connection. This mis-latch occurs if the cocking ring is pushed back under the locking balls causing the locking sleeve to slide forward. When this occurs, the action forces and retains the locking balls inward, and holds the valve assembly in the open position. The mis-latch can lead to failure of the connection, which in the case of a buddy breather system, for example, can be dangerous as the second breather may not connect to the air supply.

SUMMARY OF THE INVENTION

The present invention provides for an enhanced quick coupling having a push-to-connect locking mechanism that eliminates the potential for a mis-latched condition that can occur in the conventional configuration. Generally, when the nipple is introduced into the coupler, the nipple nose first engages an interface seal and begins pushing the valve toward the open position, and a ramp on the nipple engages locking balls of the coupler. As the nipple is further inserted, the nipple ramp pushes the locking balls longitudinally inward within a slot defined by a ball body that houses the locking balls, and radially outward into a recess of the locking sleeve. A spring loaded slider is moved inward commensurately by the movement of the locking balls. The nipple includes a locking shoulder, and once the locking shoulder has passed under the locking balls, the slider pushes the locking balls longitudinally outward within the slot and radially inward into the ball body. When the user releases the nipple, thereby removing the insertion force, a valve spring pushes the valve, interface seal, and nipple back against the locking balls to provide a secure connection.

The addition of the recess in the locking sleeve prevents the locking balls from locking when the sleeve is moved, which avoids the mis-latch that may occur in conventional configurations. In the conventional configuration, the cocking ring is intended to maintain the locking balls radially outward. When the sleeve moves, however, the locking balls can slip radially inward and cause the mis-latch. In contrast, in the present invention the connection can be made when the locking balls are in the radially inward position, and the slider configuration permits elimination of the cocking ring. A mis-latch, therefore, is avoided.

An aspect of the invention is a coupler assembly with an enhanced configuration having a slider and a locking sleeve with specially located recesses for permitting the nipple to pass by the locking balls during the connection and disconnection operations. In exemplary embodiments, a coupler assembly includes: a valve housing; a valve that is moveable within the valve housing between a first valve position in which the valve is closed, and a second valve position in which the valve is open; a ball body that is fixed to the valve housing and defines a ball slot; at least one locking ball that is received within the ball slot and is moveable between two opposing side walls of the ball slot; a locking sleeve that is located radially outward relative to the ball body, wherein the locking sleeve is configured to interact with the at least one locking ball to lock the valve in the second position when the coupler assembly is connected to the nipple; and a slider that is positioned radially between the ball body and the locking sleeve, and longitudinally inward relative to the at least one locking ball.

During a connection operation to connect the coupler assembly to the nipple, the slider is moveable along the ball body between a first slider position and a second slider position to permit movement of the at least one locking ball within the ball slot, and the at least one locking ball also is moved into an inner recess defined by the locking sleeve. This permits insertion of the nipple past the locking balls when the valve moves from the first valve position toward the second valve position during the connection operation. The slider is biased to return to the first slider position when the valve is in the second valve position. During a disconnection operation, the locking sleeve is moved from a first sleeve position to a second sleeve position. As the nipple moves longitudinally outward, a surface of the locking shoulder of the nipple moves the at least one locking ball into an outer recess of the locking sleeve to permit removal of the nipple from the coupler assembly during the disconnection operation.

These and further features of the present invention will be apparent with reference to the following description and attached drawings. In the description and drawings, particular embodiments of the invention have been disclosed in detail as being indicative of some of the ways in which the principles of the invention may be employed, but it is understood that the invention is not limited correspondingly in scope. Rather, the invention includes all changes, modifications and equivalents coming within the spirit and terms of the claims appended hereto. Features that are described and/or illustrated with respect to one embodiment may be used in the same way or in a similar way in one or more other embodiments and/or in combination with or instead of the features of the other embodiments.

DETAILED DESCRIPTION

Figure 1:
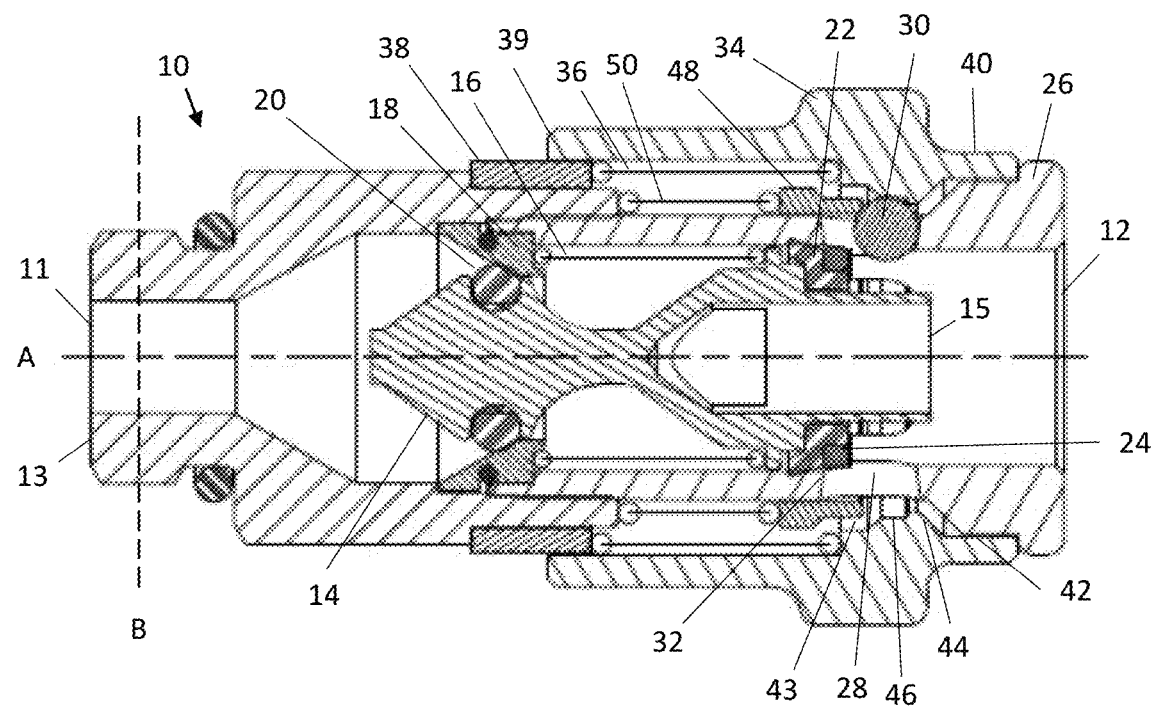
FIG. 1 is a drawing depicting a side cross-sectional view of an exemplary coupler assembly in accordance with embodiments of the present invention.

Embodiments of the present invention will now be described with reference to the drawings, wherein like reference numerals are used to refer to like elements throughout. It will be understood that the figures are not necessarily to scale.

An aspect of the invention is a coupler assembly with an enhanced configuration having a slider and a locking sleeve with specially located recesses for permitting the nipple to pass by the locking balls during the connection and disconnection operations. In exemplary embodiments, a coupler assembly includes: a valve housing; a valve that is moveable within the valve housing between a first valve position in which the valve is closed, and a second valve position in which the valve is open; a ball body that is fixed to the valve housing and defines a ball slot; at least one locking ball that is received within the ball slot and is moveable between two opposing side walls of the ball slot; a locking sleeve that is located radially outward relative to the ball body, wherein the locking sleeve is configured to interact with the at least one locking ball to lock the valve in the second position when the coupler assembly is connected to the nipple; and a slider that is positioned radially between the ball body and the locking sleeve, and longitudinally inward relative to the at least one locking ball.

During a connection operation to connect the coupler assembly to the nipple, the slider is moveable along the ball body between a first slider position and a second slider position to permit movement of the at least one locking ball within the ball slot, and the at least one locking ball also is moved into an inner recess defined by the locking sleeve. This permits insertion of the nipple past the locking balls when the valve moves from the first valve position toward the second valve position during the connection operation. The slider is biased to return to the first slider position when the valve is in the second valve position During a disconnection operation, the locking sleeve is moved from a first sleeve position to a second sleeve position. As the nipple moves longitudinally outward, a surface of the locking shoulder of the nipple moves the at least one locking ball into an outer recess of the locking sleeve to permit removal of the nipple from the coupler assembly during the disconnection operation.

FIG. 1 is a drawing depicting a side cross-sectional view of an exemplary coupler assembly 10 in accordance with embodiments of the present invention. For purposes of illustration, as referred to herein the longitudinal direction is along a horizontal axis in FIG. 1, as denoted by the dotted line A which is positioned as a longitudinal center axis. The radial axis direction is perpendicular or transverse to the longitudinal direction and is in the vertical direction in FIG. 1, as denoted by the dotted line B. The coupler assembly has a first end 11 constituting an inner end of the coupler assembly that ultimately connects to an air supply, and a second end 12 opposite from the first end constituting an outer end that receives a nipple for connection ultimately to the breathing mask or comparable breathing device. Movement toward the first end 11 is referred to herein as a longitudinal inward movement, and movement toward the second end 12 is referred to herein as a longitudinal outward movement. Radial movement along the axis B toward the longitudinal center axis A is referred to herein as a radially inward movement, and radial movement away from the longitudinal center axis A is referred to herein as a radially outward movement.

The coupler assembly 10 includes a valve housing 13 that houses a valve 14 that is moveable within the valve housing between a first valve position in which the valve is closed, and a second valve position in which the valve is open to permit the flow of air out of the coupler assembly 10. As defined herein, the second valve position corresponds to a position in which the coupler assembly 10 is connected to a nipple for use. FIG. 1 illustrates the valve 14 in the closed first position, and the valve 14 is biased toward the closed position by a valve spring 16. In such closed position, the valve 14 engages against a valve seat 18, and the closure may be enhanced with a valve seal 20 that further seals against the valve seat 18. The valve 14 is positioned adjacent to an interface seal 22 located adjacent to a longitudinal outward end 15 of the valve 14, that seals against an interface with a nipple (not shown in FIG. 1) that is inserted into the coupler assembly 10 for connection to tubing of a breathing mask or comparable breathing device. The interface seal 22 includes a stiffening washer 24 that may be bonded to or otherwise fixed against the interface sealing material, or the washer 24 may be a separate component that is positioned adjacent to or against the interface seal 22. The washer 24 reduces wear of the interface seal with operation of the coupler assembly 10.

The coupler assembly 10 further includes a ball body 26 that is fixed to the valve housing 13 and defines a ball slot 28. At least one locking ball 30 is received within the ball slot 28, and the locking balls are longitudinally moveable within the ball slot between two opposing side walls 32 of the ball slot. For purposes of illustration to show the configuration of the ball slot 28, only one locking ball 30 is shown in FIG. 1. Subsequent figures depict multiple locking balls 30 being received in the slot 28 to provide a stronger connection when the nipple is inserted. The ball slot 28 is defined by the opposing sloped walls 32 including an inward sloped wall and outward sloped wall. The sloped walls 32 of the ball body 26 that define the ball slot 28 are sloped and angled relative to the radial axis direction transverse along axis B across the coupler assembly 10. In exemplary embodiments the angle measures approximately from 5° to 8°, and the sloped walls operate to prevent the locking balls from falling through the center of a coupling bore.

The coupler assembly 10 further includes a locking sleeve 34 that located radially outward relative to the ball body 26. As further described below, the locking sleeve is configured to interact with the at least one locking ball to lock the valve in the second valve position when the coupler assembly is connected to the nipple. The locking sleeve is longitudinally moveable relative to the ball body 26 between a first sleeve position and a second sleeve position, the first sleeve position of the locking sleeve being shown in FIG. 1. A sleeve spring 36 biases the locking sleeve 34 toward the first sleeve position. The sleeve includes an inner end 39 that slidably rests against an outer surface of a retainer 38 that circumscribes the valve housing 13, and includes an outer end 40 opposite from the inner end that slidably rests against a shelf portion 42 of the ball body 26.

A radially inward surface of the locking sleeve 34 defines an inner sleeve recess 43 and an outer sleeve recess 44, formed on opposite sides of a sleeve protrusion 46. As further detailed below in the description of operation of the coupler assembly 10, the inner sleeve recess 43 receives the at least one locking ball during the connection operation to permit insertion of the nipple when the valve moves from the first valve position toward the second valve position. In addition, the outer sleeve recess 44 receives the at least one locking ball when the locking sleeve is in the second position to permit removal of the nipple during the disconnection operation.

The coupler assembly 10 further includes a slider 48 that is positioned radially between the ball body 26 and locking sleeve 34, and longitudinally inward relative to the at least one locking ball 30. As further detailed below, during a connection operation to connect the coupler assembly to the nipple, the slider 48 is moveable along the ball body 26 between a first slider position and a second slider position to permit movement of the at least one locking ball within the ball slot, which permits insertion of the nipple when the valve moves from the first valve position toward the second valve position. A slider spring 50 biases the slider toward the first slider position. The slider slidably rests against an outer surface of the ball body 26 longitudinally inward relative to the locking balls 30. In addition, the slider 48 is located radially inward relative to the locking sleeve 34.

FIG. 1 illustrates the coupler assembly 10 in a disconnected state. As referenced above, in such disconnected state: (1) the valve 14 is in the closed first valve position under the bias of the valve spring 16; (2) the locking sleeve 34 is in the first sleeve position constituting a longitudinally outward position under the bias of the sleeve spring 36; and (3) the slider 48 is in the first slider position constituting a longitudinally outward position under the bias of the slider spring 50. The coupler assembly 10 can provide a connection between an air supply and a breathing mask or comparable breathing apparatus, whereby the connection is formed using a push-to-connect operation. To achieve such connection, a user applies simple hand force to push a nipple connector attached to the breathing mask into the coupler assembly 10. FIGS. 2-6 illustrate a progression of stages of the coupler assembly 10 to achieve connection via the push-to-connect operation of the user. For clarity of illustration, reference numerals in FIGS. 2-6 are limited to the more pertinent components involved at the respective stage of operation.

Figure 2:
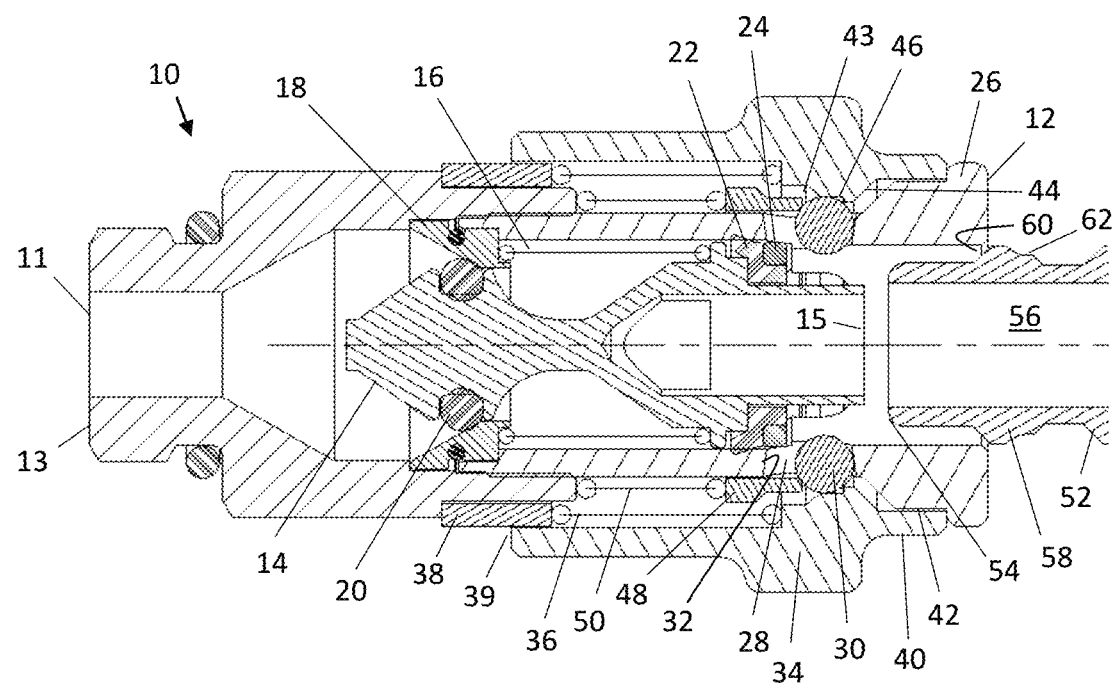
FIG. 2 is a drawing depicting a first operational step for connection of the coupler assembly of FIG. 1 to a nipple of a breathing apparatus.

FIG. 2 is a drawing depicting a first operational step for connection of the coupler assembly 10 to a nipple 52 of a breathing apparatus. In this first operational step, the nipple 52 constituting an end connector of the breathing apparatus is introduced by hand force of a user into the coupler assembly 10 at the outer end 12. Because at this stage the nipple 52 is merely introduced into the outer end 12 of the coupler assembly 10 but there still is no interaction between the nipple 52 and the coupler assembly 10, the coupler assembly 10 remains in the disconnected state comparably as depicted in FIG. 1 with the valve 14 in the closed first valve position.

The nipple 52 is largely conventional, and thus the coupler assembly 10 is versatile in being usable with existing nipples without having to redesign the nipple. As is conventional, the nipple 52 includes a nipple nose 54 that circumscribes the outward end 15 of the valve 14 when connected, as further detailed below. The nipple 52 further includes an internal passage 56 that permits the flow of air from the coupler assembly 10 into the breathing apparatus. Adjacent the nipple nose 54, the nipple 52 further includes a nipple protrusion 58 having a first surface that acts as a nipple ramp 60, and a second surface opposite from the nipple ramp 60 that acts as a locking shoulder 62. Generally, and also as further detailed blow, the nipple ramp 60 interacts against the locking balls 30 to move the locking balls radially outward to permit insertion of the nipple 52 into the coupler assembly 10, and the locking shoulder 62 locks against the locking balls 30 to maintain the connected state.

Figure 3:
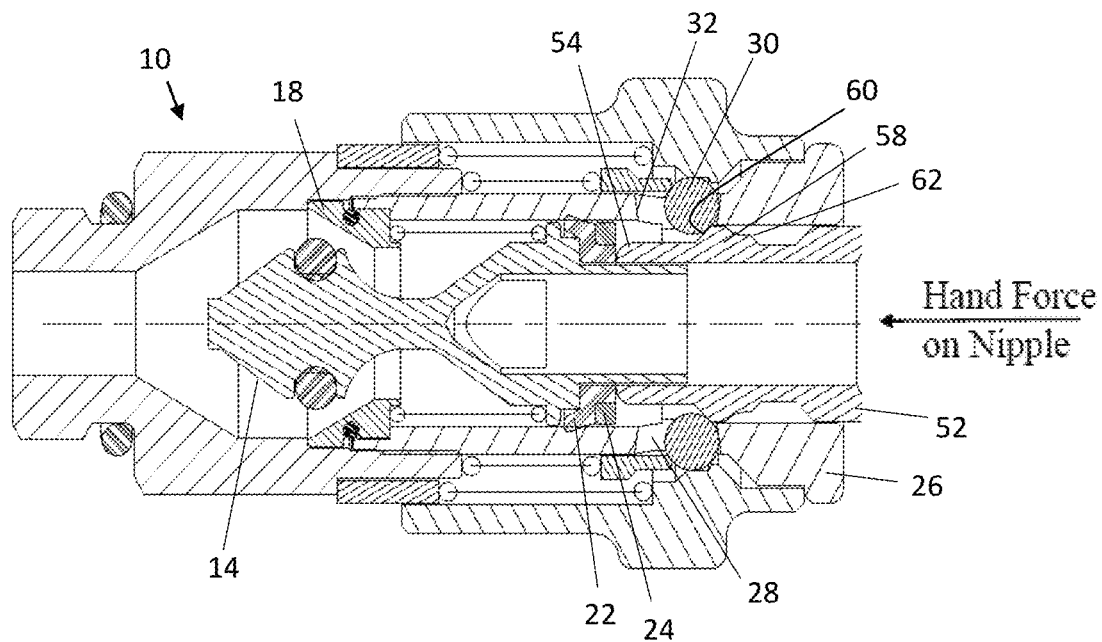
FIG. 3 is a drawing depicting a second operational step for connection of the coupler assembly to the nipple of the breathing apparatus.

FIG. 3 is a drawing depicting a second operational step for connection of the coupler assembly 10 to the nipple 52 of the breathing apparatus. FIG. 3 provides an indication of the hand force that is continuing to be applied by the user to the nipple 52. In this second operational step, by continued application of hand force by the user, the nipple nose 54 engages the interface seal and interacts against the interface seal 22 to move the valve 14 longitudinally inward. The washer 24 provides a stiffening element that prevents wear of the sealing material as the interface seal 22 slides along an inner surface of the ball body 26. As a result of the interaction of the nipple nose 52 against the interface seal 22, the valve 14 is moved from the first valve position (closed), off the valve seat 18 toward the connected second valve position (open). In the nipple position of the second operational step of FIG. 3, the nipple ramp 60 first engages the locking balls 30.

Figure 4:
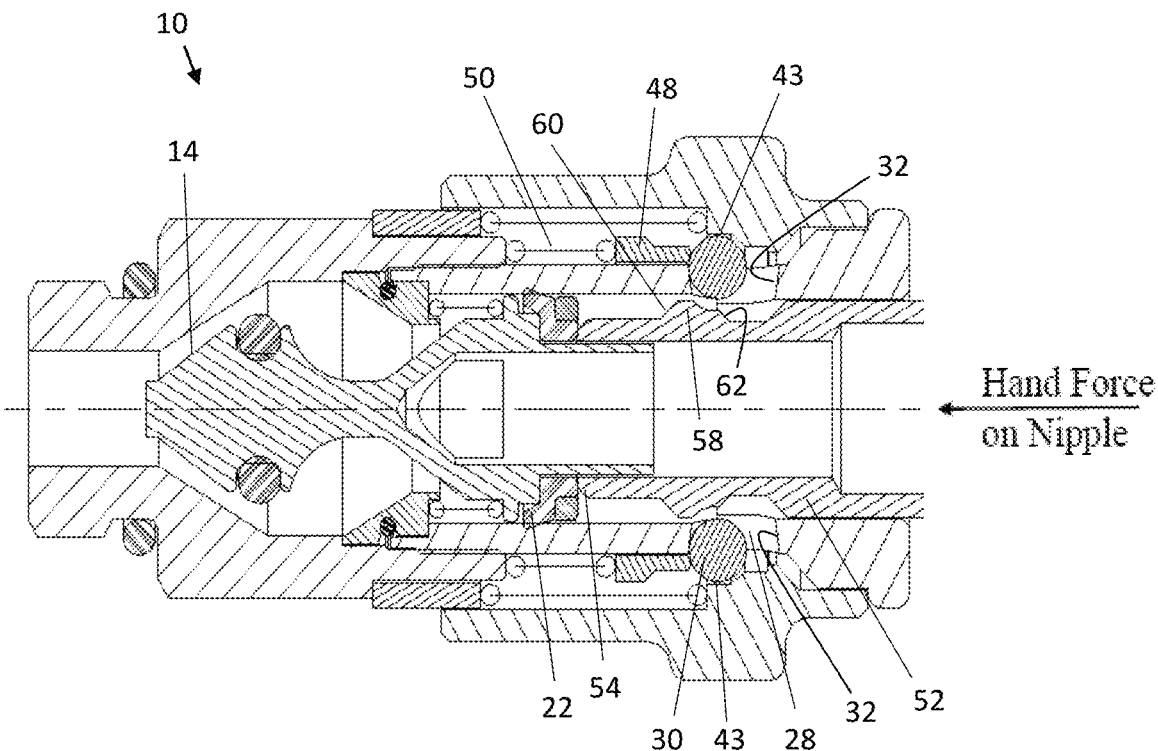
FIG. 4 is a drawing depicting a third operational step for connection of the coupler assembly to the nipple of the breathing apparatus.

FIG. 4 is a drawing depicting a third operational step for connection of the coupler assembly 10 to the nipple 52 of the breathing apparatus. In this third operational step, by continued application of hand force by the user, the nipple nose 54 further interacts against the interface seal 22 to move the valve 14 further longitudinally inward toward the connected second valve position. For purposes of comparison, in FIGS. 1-3 the locking ball(s) is positioned against a longitudinally outward one of the sloped walls 32 that define the ball slot 28. At the stage of FIG. 4 in contrast, the interaction of the nipple ramp 60 against the locking balls 30 has moved the locking balls 30 longitudinally inward toward the longitudinally inward one of the sloped walls 32 that define the ball slot 28. In addition, at the stage of FIG. 4 by action of the nipple ramp 60 the locking balls 30 have moved radially outward to rest within the inner sleeve recess 43 of the locking sleeve 34. Furthermore at the stage of FIG. 4, the movement of the locking balls 30 in turn has applied a force on the slider 48 to move the slider 48 longitudinally inward against the bias of the slider spring 50 from the first slider position to the second slider position.

Figure 5:
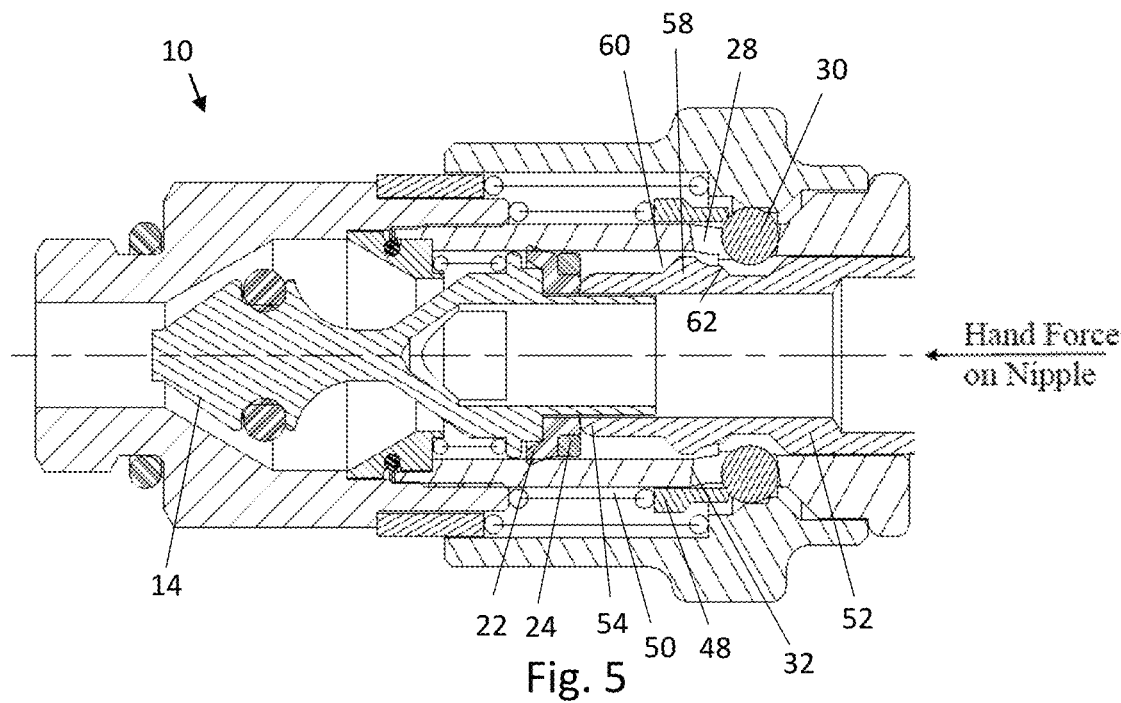
FIG. 5 is a drawing depicting a fourth operational step for connection of the coupler assembly to the nipple of the breathing apparatus.

FIG. 5 is a drawing depicting a fourth operational step for connection of the coupler assembly 10 to the nipple 52 of the breathing apparatus. In this fourth operational step, by continued application of hand force by the user, the nipple nose 54 further interacts against the interface seal 22 to move the valve 14 further longitudinally inward, which as further explained below actually is longitudinally inward past the connected second valve position at which the connection actually is maintained. At the stage of FIG. 5, the nipple protrusion 58 (including the nipple ramp 60 and locking shoulder 62) has moved longitudinally inward past the locking balls 30, and as a result the nipple protrusion 58 has disengaged from the locking balls 30. With no force of the nipple protrusion 58 against the locking balls 30, the longitudinally inward force likewise is removed from the slider 48. Accordingly, under the bias of the slider spring 50 the slider is moved longitudinally outward from the second slider position back to the first slider position. The slider movement in turn moves the locking balls longitudinally outward in the ball slot 28, and radially inward within the ball body 26, to again rest against an outer one of the sloped walls 32 of the ball slot 28.

Figure 6:
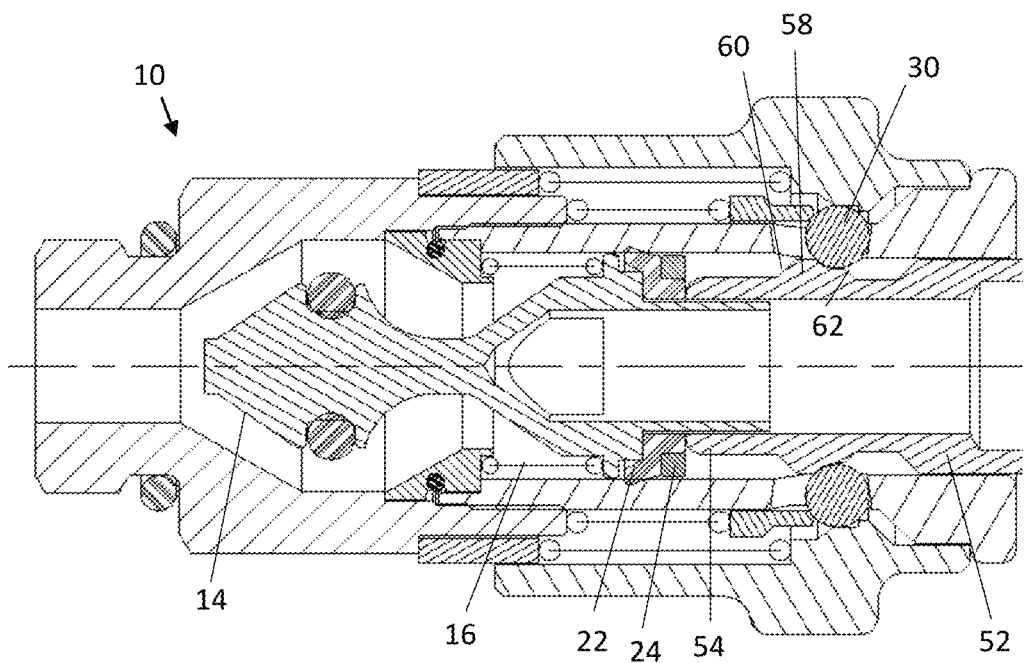
FIG. 6 is a drawing depicting a fifth operational step for connection of the coupler assembly to the nipple of the breathing apparatus.
Figure 7:
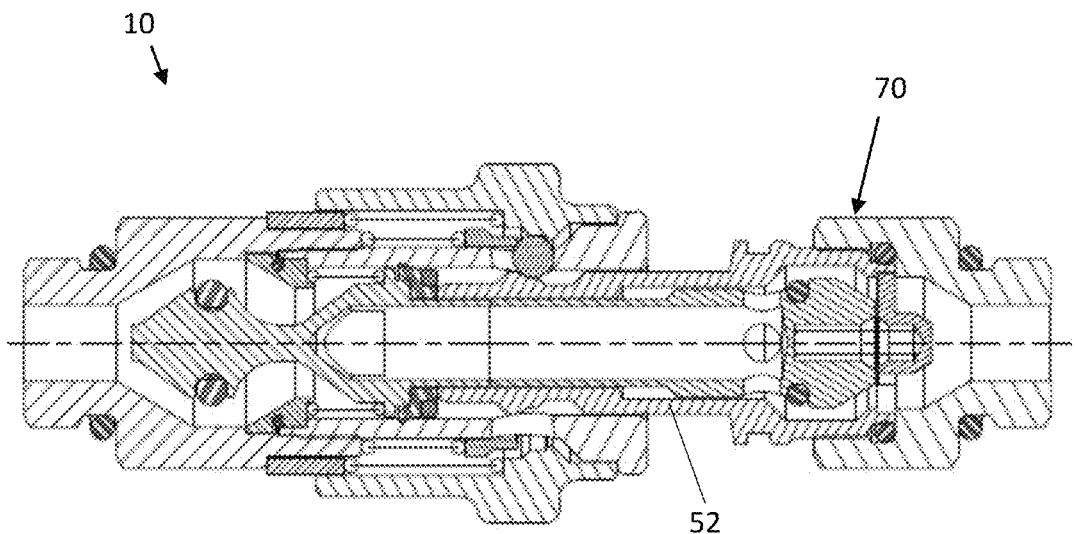
FIG. 7 is a drawing depicting a longer view of the connected state of the coupler assembly to the nipple of the breathing apparatus.

FIG. 6 is a drawing depicting a fifth operational step for connection of the coupler assembly 10 to the nipple 52 of the breathing apparatus. This stage of FIG. 6 illustrates the connected state of the coupler assembly 10 and nipple 52. In this fifth operational step, the user releases the hand force. Without the hand force, the bias of the valve spring 16 pulls the valve 14, along the with interface seal 22 and washer 24, longitudinally back toward the closed first valve position. This in turn likewise moves the nipple 52 longitudinally outward, until the locking shoulder 62 interacts against the locking balls 30. The locking balls 30 thereby prevent the nipple 52 from moving further longitudinally outward, which maintains the valve 14 in the connected second position in which the valve 14 is open to permit the flow of air out from the coupler assembly 10. FIG. 7 is a drawing depicting of longer view of the connected state of the coupler assembly 10 to the nipple 52. The nipple 52 is connected to a connector assembly 70 of a breathing apparatus, which in turn would be connected to tubing ultimately connected to a breathing mask or comparable breathing device.

Figure 8:
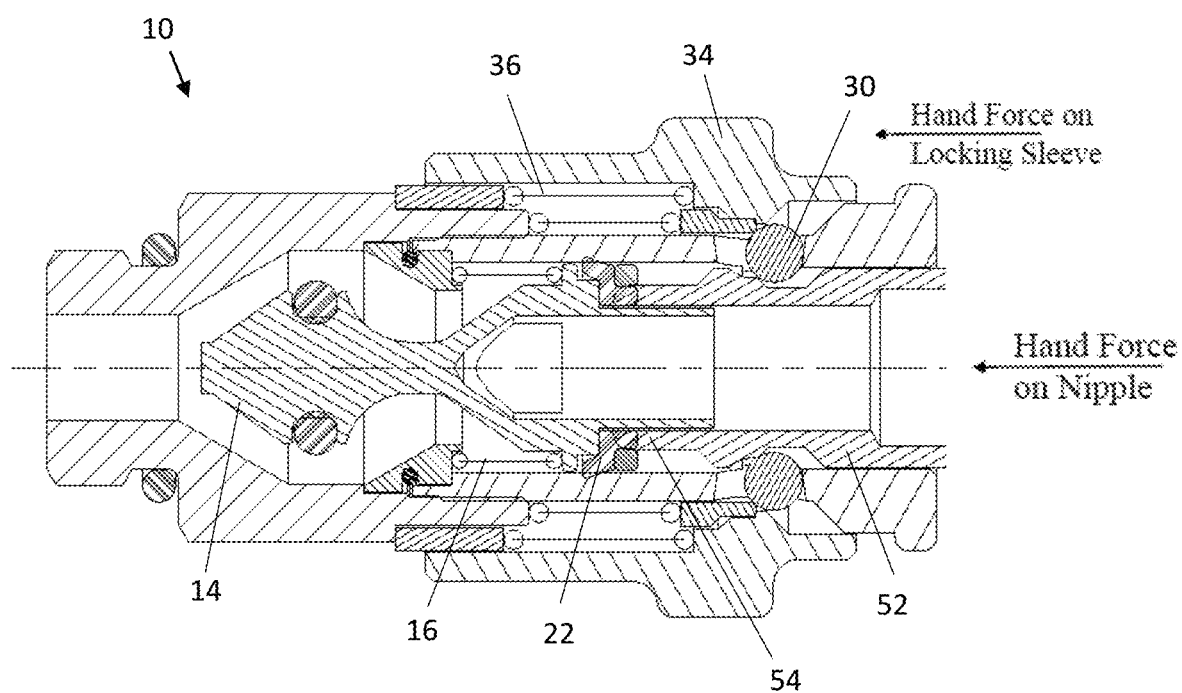
FIG. 8 is a drawing depicting a first operational step for disconnection of the coupler assembly from the nipple of the breathing apparatus.
Figure 9:
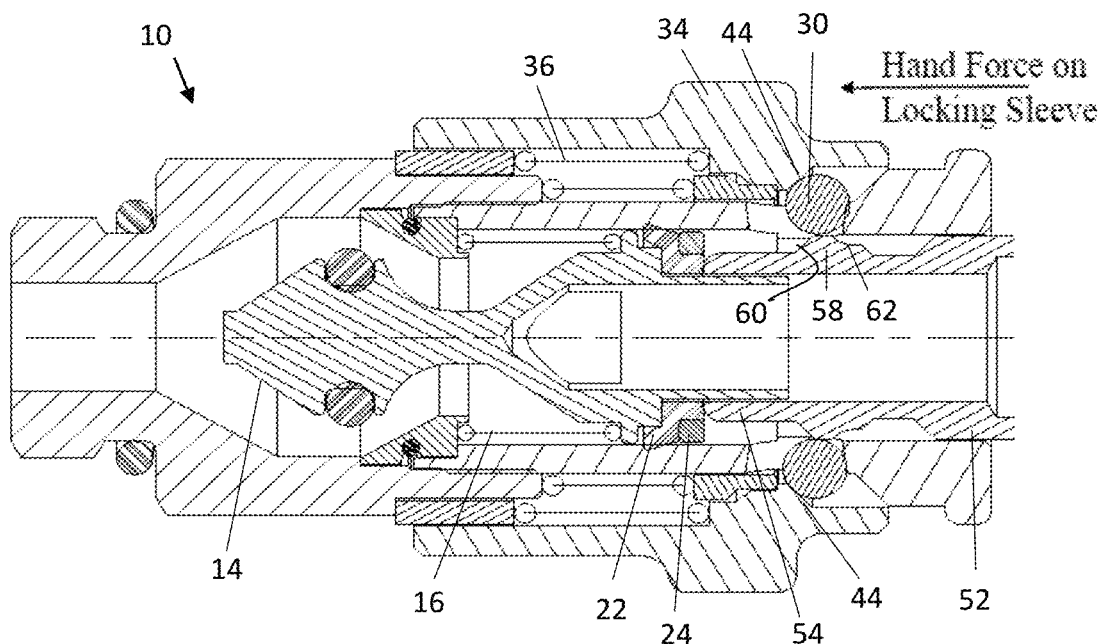
FIG. 9 is a drawing depicting a second operational step for disconnection of the coupler assembly from the nipple of the breathing apparatus.
Figure 10:
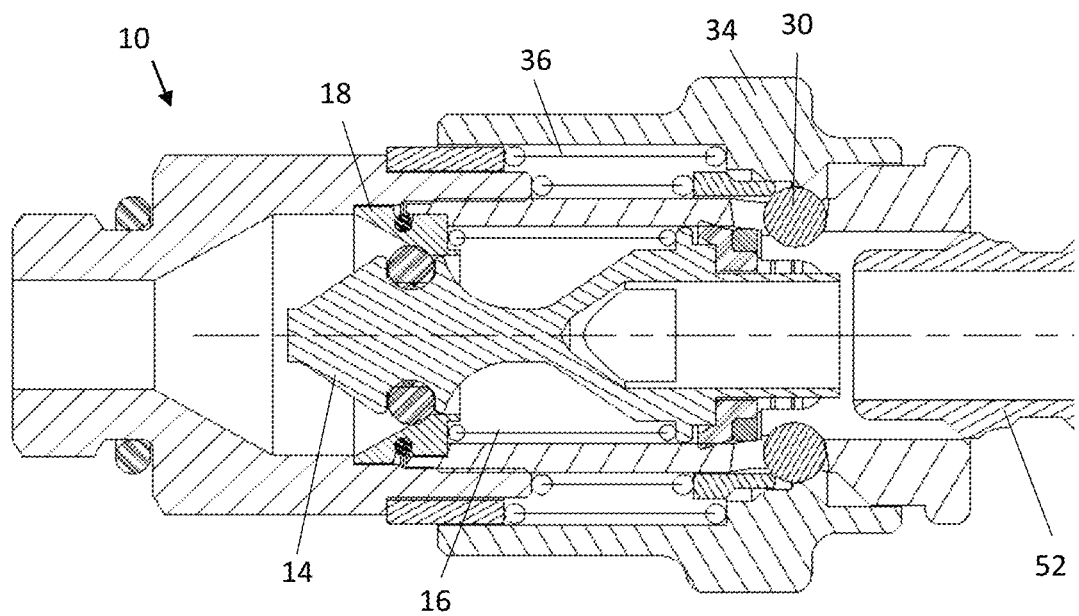
FIG. 10 is a drawing depicting a third operational step for disconnection of the coupler assembly from the nipple of the breathing apparatus.

FIGS. 8-10 and 2 next illustrate a progression of stages of the coupler assembly 10 to achieve disconnection from the nipple 52 by operation of the user. Again for clarity of illustration, reference numerals in FIGS. 8-10 are limited to the more pertinent components involved at the respective stage of operation.

FIG. 8 is a drawing depicting a first operational step for disconnection of the coupler assembly 10 from the nipple 52 of the breathing apparatus. In this first operational step for disconnection, a user applies a first hand force on the nipple 52, and a second hand force on the locking sleeve 34. The first hand force on the nipple 52 forces the valve 14 longitudinally inward from the connected second valve position, by the interaction of the nipple nose 54 against interface seal 22 (and more particularly against the washer 24) comparably as in the connection operation. The longitudinally inward movement of the valve 14 goes against the bias of the valve spring 16. In addition, the second hand force applied against the locking sleeve 34 moves the locking sleeve 34 longitudinally inward against the bias of the sleeve spring 36 from the first sleeve position of FIGS. 1-6 to the second sleeve position shown in FIG. 8.

FIG. 9 is a drawing depicting a second operational step for disconnection of the coupler assembly 10 from the nipple 52 of the breathing apparatus. In this second operational step for disconnection, the user removes the first hand force applied to the nipple 52. Without the first hand force, the bias of the valve spring 16 pulls the valve 14, along the with interface seal 22 and washer 24, longitudinally outward and back toward the closed first valve position. This in turn likewise moves the nipple 52 longitudinally outward. The second hand force against the locking sleeve 34 is maintained, which retains the locking sleeve 34 in the second sleeve position of FIG. 8. With such position of the locking sleeve 34, the outward face of the locking shoulder 62 interacts against the locking balls 30 to move the locking balls into the outer sleeve recess 44 formed in the locking sleeve 34. In contrast to the connection operation, movement of the locking balls into the outer sleeve recess 44 is permitted because the locking sleeve 34 is in the second sleeve position by operation of the second hand force. Accordingly, the nipple protrusion 58 of the nipple 52 can now pass under the locking balls 30, which permits release of the nipple 52 from the coupler assembly 10.

FIG. 10 is a drawing depicting a third operational step for disconnection of the coupler assembly 10 from the nipple 52 of the breathing apparatus. In this third operational step for disconnection, the user removes the second hand force applied to the locking sleeve 34. Without the second hand force, the bias of the sleeve spring 36 pushes the locking sleeve 34 longitudinally outward from the second sleeve position back toward the first sleeve position. In the stage depicted in FIG. 10, the locking sleeve 34 actually is positioned intermediately between the second sleeve position and the first sleeve position. In addition, the nipple 52 has been removed from engagement with the valve 14, and the valve 14 under the bias of the valve spring 16 has moved back to the first valve position, i.e., the closed position at which the valve 14 is positioned against the valve seat 18. The coupler assembly 10 then returns to the initial disconnected state of FIG. 2, with the locking sleeve 34 having returned to the first sleeve position. The nipple 52 is then fully removed from the coupler 10 to complete the disconnection operation leaving the coupler in isolation as shown in FIG. 1.

The addition of the recesses in the locking sleeve prevents the locking balls from locking when the locking sleeve is moved, which prevents the potential for the mis-latch as may occur in conventional configurations. There further is no need for the cocking ring that also is present in conventional configurations. In the present invention, the connection can be made when the locking balls are in the radially inward position, and the slider configuration permits elimination of the cocking ring. A mis-latch, therefore, is avoided, and the configuration of the present invention is more effective and simpler as compared to conventional configurations.

An aspect of the invention is a coupler assembly with an enhanced configuration having a slider and a locking sleeve with specially located recesses for permitting the nipple to pass by the locking balls during the connection and disconnection operations. In exemplary embodiments, the coupler assembly includes a valve housing; a valve that is moveable within the valve housing between a first valve position in which the valve is closed, and a second valve position in which the valve is open; a ball body that is fixed to the valve housing and defines a ball slot; at least one locking ball that is received within the ball slot and is moveable between two opposing side walls of the ball slot; a locking sleeve that is located radially outward relative to the ball body, wherein the locking sleeve is configured to interact with the at least one locking ball to lock the valve in the second valve position when the coupler assembly is connected to the nipple; and a slider that is positioned radially between the ball body and locking sleeve, and longitudinally inward relative to the at least one locking ball. During a connection operation to connect the coupler assembly to the nipple, the slider is moveable along the ball body between a first slider position and a second slider position to permit movement of the at least one locking ball within the ball slot to permit insertion of the nipple when the valve moves from the first valve position toward the second valve position, and the slider is biased to return to the first slider position when the valve is in the second valve position. The coupler assembly may include one or more of the following features, either individually or in combination.

In an exemplary embodiment of the coupler assembly, the locking sleeve has an inner sleeve recess that receives the at least one locking ball when the slider is in the second slider position to permit insertion of the nipple when the valve moves from the first valve position toward the second valve position.

In an exemplary embodiment of the coupler assembly, the coupler assembly further includes a slider spring that biases the slider toward the first slider position.

In an exemplary embodiment of the coupler assembly, the coupler assembly further includes an interface seal located adjacent to a longitudinal outward end of the valve, wherein the interface seal interfaces with the nipple during the connection operation.

In an exemplary embodiment of the coupler assembly, the interface seal includes a stiffening washer.

In an exemplary embodiment of the coupler assembly, the ball slot receives a plurality of locking balls.

In an exemplary embodiment of the coupler assembly, the opposing walls of the ball slot are sloped relative to a radial axis of the coupler assembly.

In an exemplary embodiment of the coupler assembly, an angle of the slope is from 5° to 8°.

In an exemplary embodiment of the coupler assembly, during a disconnection operation to disconnect the coupler assembly from the nipple, the locking sleeve is longitudinally moveable relative to the ball body between a first sleeve position and a second sleeve position to permit removal of the nipple from the coupler assembly.

In an exemplary embodiment of the coupler assembly, the locking sleeve includes an outer sleeve recess that receives the at least one locking ball when the locking sleeve is in the second position to permit removal of the nipple during the disconnection operation.

In an exemplary embodiment of the coupler assembly, the coupler assembly further includes a sleeve spring that biases the locking sleeve toward the first sleeve position.

In an exemplary embodiment of the coupler assembly, the coupler assembly further includes a valve spring that biases the valve toward the first valve position.

In an exemplary embodiment of the coupler assembly, the valve includes a valve seal that seals against a valve seat of the valve housing when the valve is in the first valve position.

Another aspect of the invention is a method of operating a coupler assembly including a connection operation for connecting the coupler assembly to a nipple. In exemplary embodiments, the connection operation includes the steps of: providing a coupler assembly according to any of the embodiments; inserting the nipple into the coupler assembly and applying a hand force to the nipple to move the valve from the first valve position toward the second valve position; wherein the nipple includes a protrusion having a nipple ramp and a nipple shoulder opposite from the nipple ramp, and the locking sleeve includes an inner sleeve recess; further inserting the nipple into the coupler assembly, wherein the nipple ramp moves the at least one locking ball longitudinally inward within the ball slot which moves the slider from the first slider position to the second slider position, and wherein the locking sleeve has an inner sleeve recess that receives the at least one locking ball when the slider is in the second slider position to permit further insertion of the nipple; further inserting the nipple until the locking shoulder is moved past the at least one locking ball, wherein the slider returns to the first slider position which moves the at least one locking ball longitudinally outward and radially inward within the ball slot; and releasing the hand force, wherein a bias of the valve moves the valve longitudinally outward to the second valve position, and in the second valve position the locking shoulder of the nipple interacts against the at least one locking ball to maintain a connection between the coupler assembly and the nipple.

In exemplary embodiments, the method of operating a coupler assembly of further includes a disconnection operation for disconnecting the coupler assembly from nipple, the disconnection operation comprising the steps of: applying a first hand force to the nipple to move the valve longitudinally inward from the second valve position; applying a second hand force to the locking sleeve to move the locking sleeve longitudinally inward from a first sleeve position to a second sleeve position; releasing the first hand force, wherein the nipple moves longitudinally outward under a bias of the valve, while maintaining the second hand force to retain the locking sleeve in the second sleeve position; wherein as the nipple moves longitudinally outward, a surface of the locking shoulder of the nipple moves the at least one locking ball into an outer recess of the locking sleeve to permit removal of the nipple from the coupler assembly; and removing the nipple from the coupler assembly, wherein the bias of the valve returns the valve to the first valve position in which the valve is closed.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A coupler assembly for connecting to a nipple, the coupler assembly comprising:
   a valve housing;
   a valve that is moveable within the valve housing between a first valve position in which the valve is closed, and a second valve position in which the valve is open;
   a ball body that is fixed to the valve housing and defines a ball slot;
   at least one locking ball that is received within the ball slot and is moveable between two opposing side walls of the ball slot;
   a locking sleeve that is located radially outward relative to the ball body, wherein the locking sleeve is configured to interact with the at least one locking ball to lock the valve in the second valve position when the coupler assembly is connected to the nipple; and
   a slider that is positioned radially between the ball body and locking sleeve, and longitudinally inward relative to the at least one locking ball;
   wherein during a connection operation to connect the coupler assembly to the nipple, the slider is moveable along the ball body between a first slider position and a second slider position to permit movement of the at least one locking ball within the ball slot to permit insertion of the nipple when the valve moves from the first valve position toward the second valve position, and the slider is biased to return to the first slider position when the valve is in the second valve position;
   the coupler assembly further comprising an interface seal located adjacent to a longitudinal outward end of the valve, wherein the interface seal interfaces with the nipple during the connection operation and the interface seal includes a stiffening washer.

2. The coupler assembly of claim 1, wherein the locking sleeve has an inner sleeve recess that receives the at least one locking ball when the slider is in the second slider position to permit insertion of the nipple when the valve moves from the first valve position toward the second valve position.

3. The coupler assembly of claim 1, further comprising a slider spring that biases the slider toward the first slider position.

4. The coupler assembly of claim 1, wherein the ball slot receives a plurality of locking balls.

5. The coupler assembly of claim 1, wherein the opposing walls of the ball slot are sloped relative to a radial axis of the coupler assembly.

6. The coupler assembly of claim 5, wherein an angle of the slope is from 5° to 8°.

7. The coupler assembly of claim 1, wherein during a disconnection operation to disconnect the coupler assembly from the nipple, the locking sleeve is longitudinally moveable relative to the ball body between a first sleeve position and a second sleeve position to permit removal of the nipple from the coupler assembly.

8. The coupler assembly of claim 7, wherein the locking sleeve includes an outer sleeve recess that receives the at least one locking ball when the locking sleeve is in the second position to permit removal of the nipple during the disconnection operation.

9. The coupler assembly of claim 7, further comprising a sleeve spring that biases the locking sleeve toward the first sleeve position.

10. The coupler assembly of claim 1, further comprising a valve spring that biases the valve toward the first valve position.

11. The coupler assembly of claim 1, wherein the valve includes a valve seal that seals against a valve seat of the valve housing when the valve is in the first valve position.

12. A method of operating a coupler assembly including a connection operation for connecting the coupler assembly to the nipple, the connection operation comprising the steps of:
   providing the coupler assembly according to claim 1;
   inserting the nipple into the coupler assembly and applying a hand force to the nipple to move the valve from the first valve position toward the second valve position;
   wherein the nipple includes a protrusion having a nipple ramp and a nipple shoulder opposite from the nipple ramp, and the locking sleeve includes the inner sleeve recess;
   further inserting the nipple into the coupler assembly, wherein the nipple ramp moves the at least one locking ball longitudinally inward within the ball slot which moves the slider from the first slider position to the second slider position, and wherein the locking sleeve has an inner sleeve recess that receives the at least one locking ball when the slider is in the second slider position to permit further insertion of the nipple;
   further inserting the nipple until the locking shoulder is moved past the at least one locking ball, wherein the slider returns to the first slider position which moves the at least one locking ball longitudinally outward and radially inward within the ball slot; and
   releasing the hand force, wherein a bias of the valve moves the valve longitudinally outward to the second valve position, and in the second valve position the locking shoulder of the nipple interacts against the at least one locking ball to maintain a connection between the coupler assembly and the nipple;
   the method of operating the coupler assembly further including a disconnection operation for disconnecting the coupler assembly from the nipple, the disconnection operation comprising the steps of:
   applying a first hand force to the nipple to move the valve longitudinally inward from the second valve position;
   applying a second hand force to the locking sleeve to move the locking sleeve longitudinally inward from a first sleeve position to a second sleeve position;
   releasing the first hand force, wherein the nipple moves longitudinally outward under the bias of the valve, while maintaining the second hand force to retain the locking sleeve in the second sleeve position;
   wherein as the nipple moves longitudinally outward, a surface of the locking shoulder of the nipple moves the at least one locking ball into an outer recess of the locking sleeve to permit removal of the nipple from the coupler assembly; and
   removing the nipple from the coupler assembly, wherein the bias of the valve returns the valve to the first valve position in which the valve is closed.

13. A coupler assembly for connecting to a nipple, the coupler assembly comprising:
   a valve housing;

a valve that is moveable within the valve housing between a first valve position in which the valve is closed, and a second valve position in which the valve is open;

a ball body that is fixed to the valve housing and defines a ball slot;

at least one locking ball that is received within the ball slot and is moveable between two opposing side walls of the ball slot;

a locking sleeve that is located radially outward relative to the ball body, wherein the locking sleeve is configured to interact with the at least one locking ball to lock the valve in the second valve position when the coupler assembly is connected to the nipple; and a slider that is positioned radially between the ball body and locking sleeve, and longitudinally inward relative to the at least one locking ball;

wherein during a connection operation to connect the coupler assembly to the nipple, the slider is moveable along the ball body between a first slider position and a second slider position to permit movement of the at least one locking ball within the ball slot to permit insertion of the nipple when the valve moves from the first valve position toward the second valve position, and the slider is biased to return to the first slider position when the valve is in the second valve position; and wherein the ball slot receives a plurality of locking balls.

* * * * *